(12) United States Patent
Shen et al.

(10) Patent No.: US 12,461,165 B2
(45) Date of Patent: Nov. 4, 2025

(54) METHOD FOR BALANCING BATTERY MODULES

(71) Applicant: Nilar International AB, Täby (SE)

(72) Inventors: Yang Shen, Gävle (SE); Stina Starborg, Sollentuna (SE)

(73) Assignee: Nilar International AB, Täby (SE)

( * ) Notice: Subject to any disclaimer, the term of this patent is extended or adjusted under 35 U.S.C. 154(b) by 509 days.

(21) Appl. No.: 17/906,705

(22) PCT Filed: Mar. 25, 2021

(86) PCT No.: PCT/SE2021/050262
§ 371 (c)(1),
(2) Date: Sep. 19, 2022

(87) PCT Pub. No.: WO2021/201748
PCT Pub. Date: Oct. 7, 2021

(65) Prior Publication Data
US 2023/0176139 A1    Jun. 8, 2023

(30) Foreign Application Priority Data

Mar. 31, 2020 (SE) .................... 2050360-3

(51) Int. Cl.
*G01R 31/396* (2019.01)
*G01R 31/388* (2019.01)
(Continued)

(52) U.S. Cl.
CPC ......... *G01R 31/396* (2019.01); *G01R 31/388* (2019.01); *G01R 31/389* (2019.01);
(Continued)

(58) Field of Classification Search
CPC .. G01R 31/396; G01R 31/388; G01R 31/389; H01M 10/28; H01M 10/4207; H01M 10/4242
See application file for complete search history.

(56) References Cited

U.S. PATENT DOCUMENTS

2005/0244704 A1*  11/2005  Sloop ................. H01M 50/691
                                                                    429/49
2019/0058225 A1*   2/2019  Noréus ................ H01M 4/244

FOREIGN PATENT DOCUMENTS

JP    2003045387 A  *  2/2003
WO   2006104442 A1    10/2006
(Continued)

OTHER PUBLICATIONS

Shen et al., "Increasing NiMH Battery Cycle Life with Oxygen" Oct. 4, 2018 International Journal of Hydrogen Energy 43 downloaded from https://doi.org/10.1016/j.ijhydene.2018.03.020 (Year: 2018).*

(Continued)

*Primary Examiner* — Michael J Dalbo
*Assistant Examiner* — Denise R Karavias
(74) *Attorney, Agent, or Firm* — Capitol City TechLaw

(57) ABSTRACT

The present invention relates to a method for improving the operational efficiency of a battery pack (100) comprising at least two battery modules (10, 10', 10"), wherein each battery pack is configured to have a common gas space (29). The method comprises the steps of: obtaining data (101) on the battery modules (10, 10', 10"), wherein the data relates to the number of battery cells per battery module, the number of battery modules, the temperature of each battery module and the energy capacity of the battery modules; obtaining (102) an indication of the internal resistance ($R_{i1}$, $R_{i2}$, $R_{i3}$) for the battery modules; determining (104), in case a difference in indication parameters between any of the (Continued)

battery modules exceeds a first threshold value, a filling amount of oxygen to be filled into the battery pack; and initiating (107) filling of the battery pack based on the determined filling amount of oxygen.

15 Claims, 6 Drawing Sheets

(51) Int. Cl.
*G01R 31/389* (2019.01)
*H01M 10/28* (2006.01)
*H01M 10/42* (2006.01)

(52) U.S. Cl.
CPC ....... *H01M 10/28* (2013.01); *H01M 10/4207* (2013.01); *H01M 10/4242* (2013.01)

(56) References Cited

FOREIGN PATENT DOCUMENTS

| WO | 2007093626 A1 | 8/2007 |
| WO | 2016072026 A1 | 5/2016 |
| WO | 2017060962 A1 | 4/2017 |
| WO | 2017069691 A1 | 4/2017 |
| WO | 2018111182 A1 | 6/2018 |

OTHER PUBLICATIONS

Yang Shen et al., "Increasing NiMH battery cycle life with oxygen", International Journal of Hydrogen Energy, Elsevier Science Publishers B.V., Barking, GB, vol. 43, No. 40, Mar. 29, 2018, pp. 18626-18631.

\* cited by examiner

METHOD FOR BALANCING BATTERY MODULES

This application claims priority under 35 USC 119(a)-(d) from SE patent application No. 2050360-3 filed Mar. 31, 2020, the entire content of which is incorporated herein by reference.

TECHNICAL FIELD

The present invention relates generally to the field of batteries, especially nickel metal hydride, NiMH, batteries. The present invention relates to a method for a battery pack where hydrogen or oxygen gas or hydrogen peroxide is added to improve performance. Further, the present invention relates specifically to the field of increasing the lifetime of the battery pack.

BACKGROUND ART

Nickel metal hydride (NiMH) batteries have long cycle life and have rapid charge and discharge capabilities. During charge and discharge the electrodes interact with each other through the alkaline electrolyte as hydrogen is transported in the form of water molecules between the electrodes. During discharge hydrogen is released from the negative electrode and is allowed to migrate to the positive electrode (nickel electrode) where it intercalates. This binding result in energy is released. During charging the hydrogen migration is reversed.

Especially NiMH batteries are designed to be nickel electrode limited with a starved electrolyte. This is done in order to be able to avoid over charge and over discharge states of the battery cells by controlling the battery cell chemistry and state-of-charge via the gas phase.

When the battery cell is charged, hydrogen is transported from the nickel hydroxide to the metal hydride by water molecules in the aqueous alkaline electrolyte. During discharge hydrogen is transported back to the nickel hydroxide electrode, again in the form of water molecules.

The PCT publication WO 2017/069691 describes that a proper balance of the nickel electrode capacity with respect to the metal hydride electrode capacity with suitable amounts of both over charge- and over discharge-reserves are essential for a well-functioning battery module, enabling it to reach a stable long time charge/discharge performance. Adding oxygen gas, hydrogen gas or hydrogen peroxide provides a suitable overcharge and discharge reserve and replenishes the electrolyte, which prolongs the lifetime of the battery module and increases the number of possible cycles.

The adding of oxygen is preferably performed when the battery module is not in operation. Thus, in order to optimize the operation of the battery module, filling of oxygen should preferably be done in a way that optimizes not only the capacity of the battery module but also the operating time.

SUMMARY OF THE INVENTION

An objective of the present invention is to provide a method comprising improving the operational efficiency by adding oxygen to a battery pack comprising at least two battery modules, wherein each battery module comprises at least one battery cell which at least alleviates one of the drawbacks of the prior art.

This objective is fulfilled with a method according to the independent claim.

Further advantages of the invention are provided with the features of the dependent claims.

According to a first aspect of the present invention a method is provided for improving the operational efficiency of a battery pack comprising at least two battery modules, wherein each battery module comprises at least one battery cell. Each battery module has a casing encompassing the at least one battery cell and enclosing a gas space, wherein the gas spaces of the battery modules are connected to each other to form a common gas space. Each battery cell comprises a first electrode, a second electrode, a porous separator, and an aqueous alkaline electrolyte arranged between the first electrode and the second electrode, wherein the porous separator, the first electrode and the second electrode are configured to allow exchange of hydrogen and oxygen by allowing gas to migrate between the electrodes. At least one of the casings comprises a gas inlet for adding a gas or a liquid to the common gas space of the casings. The method is characterized in that it comprises the step of obtaining data on the battery modules, wherein the data relates to the number of battery cells per battery module, the number of battery modules, the temperature of each battery module and the energy capacity of the battery modules. The method is characterized in that it also comprises the steps of obtaining an indicative parameter related to an internal resistance for at least two of the battery modules; determining, in case the difference in indicative parameters between any of the battery modules exceeds a predetermined first threshold value, based on the indicative parameter and the data on the battery module, a filling amount of oxygen to be filled into the battery module in order to reduce the difference indicative parameters between any two battery modules to a level below the first threshold value.

The method may also comprise the step of initiating filling of the battery pack with the determined filling amount of oxygen. The initiation may comprise the step of placing an order for a gas container with the correct filling amount of oxygen at the correct pressure to be sent to the battery module. Alternatively, in case the battery module is connected to an oxygen supply, the initiation may comprise the initiation of filling of oxygen from the oxygen supply.

By the method according to the first aspect of the present invention the operational efficiency of the battery may be improved compared to methods according to the prior art. With operational efficiency is meant that the lifetime of the battery modules is improved and while at the same time keeping the time for oxygen refill low. A proper balance of the internal resistances per battery cell for the different battery modules gives a longer lifetime. By having a threshold for the imbalance between the internal resistances per battery cell for the different battery modules it is avoided that the battery is run with a high internal resistance while simultaneously a too short time between fillings is avoided.

The method may be implemented in a control unit, which may comprise a computer.

The step of obtaining the indicative parameter, such as data to determine the internal resistance or the state of health, SOH, for at least two of the battery modules is preferably implemented by receiving data from a measuring unit configured to obtain the indicative parameter for at least two of the battery modules. The number of battery cells in the battery module is obtained from the data on the battery modules. The number of cells in the determination is governed by practical limitations. Usually, it is only possible to get access to the terminal contacts of a battery module. Thus, the indicative parameter, e.g. SOH or internal resistance, are determined for all battery cells in the battery module.

The step of obtaining data on the battery module, which data relates to at least the number of battery cells of the battery module and the energy capacity of the battery module, may be done in many different ways. One alternative is to have the measuring unit configured to send data on the battery module to the computer device which performs the method. The data may be sent from the measuring unit, but in order to minimize the complexity of the measuring unit it is preferable that the measuring unit only sends an identification number. On receipt of the identification number from the measuring unit the data may be obtained from, e.g., a memory. As stated above the data relates to at least the number of battery cells of the battery module, the temperature of each battery module and the energy capacity of the battery module. This data is necessary to be able to determine the filling amount of oxygen to be filled into the battery module. It is, however, not necessary to use the actual number of battery cells of the battery module, or the energy capacity of the battery module in the determination. According to one alternative the control unit may consult a look-up table in a memory to retrieve the data on the battery corresponding to the identification number of the battery module. The data on the battery may in one example be a type number identifying the type of battery. The control unit may then retrieve from a different look-up table the necessary filling amount of oxygen based on the determined indicative parameters, temperature and the type number. The necessary filling amount of oxygen in the look-up table may in turn be based on earlier experiments with a similar battery type. The type number defines a battery module with a predetermined number of battery cells and a predetermined energy capacity and optionally a predetermined volume of the common gas space.

Preferably, in case the obtained indicative parameter is the internal resistance which refers to the internal resistance over a plurality of battery cells, an average internal resistance per battery cell is calculated at the measured battery pack and/or battery module temperatures. The average internal resistance per battery cell is then compared to a resistance threshold at the measured temperature value for a single battery cell. In principle it is possible to compare the difference in internal resistance between different battery modules with a resistance threshold value for the difference, but this is equivalent to compare the difference in internal resistance between battery cells from different battery modules with a resistance threshold value at the measured temperature. A drawback with comparing the difference in internal resistance between different battery modules with a resistance threshold value is that different resistance thresholds have to be supplied in dependence of the number of battery cells in the battery module.

The method may also comprise the steps of obtaining a voltage indication, such as an open circuit voltage, OCV, or state of charge, SOC, at the measured temperature of at least one battery module, determining whether the voltage indication of per any of the at least two battery modules is within a predetermined voltage interval, and determining that it is safe to fill oxygen on the battery pack only if the obtained voltage indication of each battery module do not have a value outside the predetermined voltage interval. The inventors have realized that there is a risk of fire if a battery module is filled with oxygen when the voltage indication is outside the voltage interval. When OCV is used as voltage indication, it is preferred that an average voltage per battery cell is calculated from the voltage over each battery module. In that way only one voltage threshold has to be used.

The predetermined voltage interval is defined by a lower voltage indication threshold and an upper voltage indication threshold, and the voltage indication may be the open circuit voltage, OCV, over the battery module or the state of charge, SOC, for the battery module.

The method may also comprise, in case it is determined not to be safe to fill the battery pack with oxygen, the steps of initiating discharging or charging of the battery pack to a voltage for said at least one battery module within the voltage interval before initiating filling of the battery pack with the determined filling amount of oxygen. The initiation of discharging or charging may according to one alternative be to send a message to an operator of the battery to discharge or discharge the battery. Alternatively, if the battery module is connected for automatized discharging or charging, the initiation may comprise the step of starting the automatized discharging or charging.

The filling of the battery pack with an inert gas may be initiated in conjunction with, i.e. at the same time as, the initiation of filling of the battery pack with oxygen. By filling with a combination of oxygen and an inert gas the fire hazard is minimized further. In case the battery module is connected to a gas supply, the gas supply preferably contains the correct gas mixture of oxygen and inert gas.

The method may also comprise, in case it is determined not to be safe to fill the battery pack with oxygen, the step of adding hydrogen gas to the common gas space before filling the battery pack with oxygen, which further improves the operational efficiency of the battery module.

The method may also comprise the step of adding hydrogen gas to the common gas space after filling the battery pack with oxygen, which further improves the operational efficiency of the battery module.

The method may also comprise the steps, after filling of the battery pack with oxygen, measure the battery pack and/or battery module temperature and obtaining an after filling parameter related to the internal resistance for each of the battery modules, determining, whether the difference in after filling parameter between any of the at least two battery modules exceeds the predetermined second threshold value at the measured temperature, and determining, in case the difference in after filling parameter between any of the battery modules exceeds the second threshold value, based on the after filling parameter of the battery modules at the measured battery pack and/or battery module temperature and the data on the battery module, an additional filling amount of oxygen to be filled into the battery pack in order to further reduce the difference in after filling parameter between any two battery modules to a level below the second threshold value, and initiating filling of the battery pack with the determined additional filling amount of oxygen.

In an embodiment the step of obtaining the indicative parameter comprises obtaining the internal resistances of all battery modules in the battery pack at the measured battery pack and or battery module temperature. The method further comprises the steps of: determining whether the difference in internal resistance per battery cell between the battery modules in any pair of battery modules in the battery pack exceeds a predetermined first resistance threshold at the measured temperature; and determining, in case the difference in internal resistance per battery cell between the battery modules in any pair of battery modules at the measured battery pack temperature and or battery module temperatures in the battery pack exceeds the predetermined first resistance threshold at a certain temperature, from the internal resistances of the different battery modules and the obtained data on the battery pack, the amount of oxygen to be filled into the battery pack, to reduce the difference in internal resistance of each one of the battery modules below the first resistance threshold. By obtaining the internal resistance of all battery modules it may be assured that the largest difference in internal resistance is detected which is compensated for the measured temperature.

The step of determining the amount of oxygen may determine the filling amount of oxygen to be filled into the battery module in order to obtain a difference, in internal resistance per battery cell, between the battery modules below a second resistance threshold, wherein the second resistance threshold is lower than the first resistance threshold.

According to a second aspect of the present invention a computer program is provided for improving the operational efficiency of an battery pack, comprising instructions which, when executed on at least one processor, cause the at least one processor to carry out the method according to the first aspect of the invention.

According to a third aspect of the present invention a computer-readable storage medium is provided, which carries a computer program, according to the second aspect of the invention, for improving the operational efficiency of a battery pack.

Preferably, the battery pack comprises multiple battery modules having at least one NiMH battery cell.

In the following preferred embodiments of the invention will be described with reference to the drawings.

DETAILED DESCRIPTION

Figure 1:
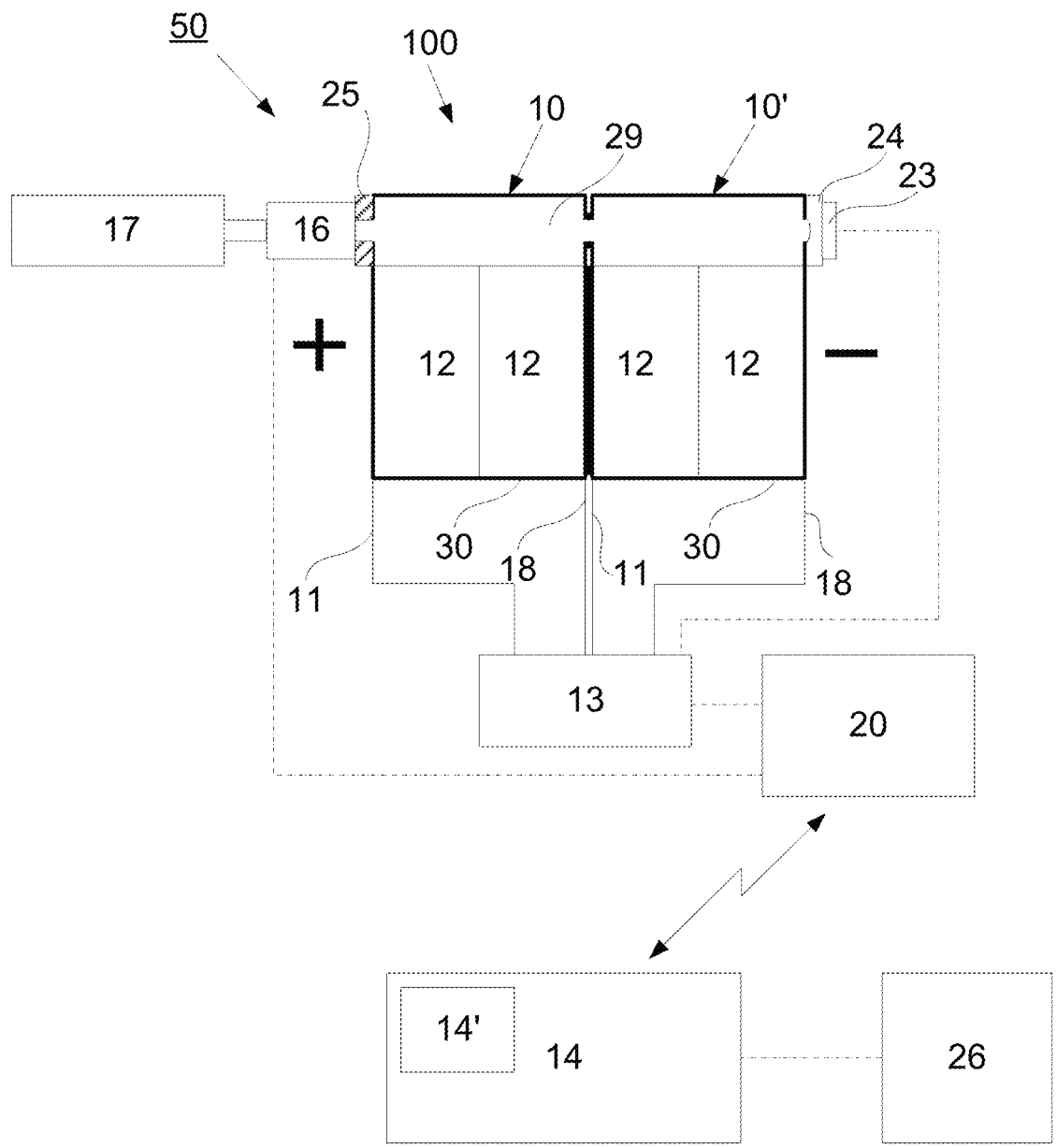
FIG. 1 illustrates a battery system for balancing a battery pack comprising two battery modules.

In the following description of preferred embodiments reference will be made to the drawings. The drawings are not drawn to scale and some dimensions may be exaggerated in order to clearly show all features. The same reference numeral will be used for similar features in the different drawings.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

In the application, the term indicative parameter related to the internal resistance of the battery module, comprises the internal resistance as well as a state of health, SOH, measure of the battery module. The SOH measure may include the internal resistance and other parameters that are important to determine the condition of the battery module, such as the internal gas pressure.

The term "internal resistance", which should be interpreted as the internal DC resistance, is commonly used in the description as a measure of the status of each battery module, and thus the battery cells. The internal resistance is obtained by measuring the voltage drop during a controlled discharge using a predetermined discharge current. The internal resistance is thereafter calculated based on the measured voltage drop and the discharge current. An example is found in the following standard IEC 63115-1, Ed. 1.0 (2020 January), chapter 7.6.3 Measurement of the internal DC resistance.

Some of the example embodiments presented herein are directed towards a method for balancing battery cells, preferably battery cells with a MH electrode, and more preferably NiMH battery cells. As part of the development of the example embodiments presented herein, a problem will first be identified and discussed.

During charge and discharge of a battery pack comprising multiple battery modules, e.g. NiMH battery modules, each battery module comprising at least one battery cell, the performance of each battery cell will deteriorate due to electrolyte dry out. It has been found that the addition of oxygen gas restores the electrolyte resulting in that the internal gas pressure decreases during use since the gas recombination is improved. Thus, the battery module becomes less sensitive to unintentional overcharging and over discharging. The starved electrolyte design means that only a minimal amount of electrolyte is available in the battery module. Any loss of electrolyte will impair performance mainly manifested in an increased internal resistance. Electrolyte dry-out is the main cause for limiting the cycle life. The electrolyte dry-out is mainly caused by either excessive internal battery cell pressure, which may open the safety valve releasing either oxygen or hydrogen gas dependent upon abusive overcharge or overdischarge and corrosion of the negative electrode that is consuming electrolyte and forming hydrogen increasing the pressure level inside the cell. When two or more battery cells are gaseously connected, the battery cells will lose electrolyte unevenly. This may be extended to be valid also for battery modules having multiple cells.

The main reason for this is that the battery cells are unevenly charged since they are not 100% identical. This will cause some cells to heat up before others, and water (in the form of gas) migrates between the gaseously connected battery cells and condensate where it is less warm. Thus water move within battery modules and even between battery modules. Thus, one of the battery modules will exhibit a faster increase in internal resistance than the other battery module. The increase in internal resistance may lead to a decreased lifetime of the battery module. An uneven increase in internal resistance between the battery modules may lead to an uneven lifetime of the battery modules, and thereby a decreased lifetime of the battery pack.

FIG. 1 shows a battery system 50 comprising two battery modules 10, 10', connected in series to form a battery pack 100. Each battery module 10, 10', comprises at least one battery cells 12 (preferably nickel-metal hydride battery cells). Each battery module 10, 10' has a casing 30 containing the at least one battery cell and enclosing a gas space. Each battery cell 12 in the battery module 10, 10', comprises a first positive electrode, a second negative electrode, a porous separator, and an aqueous alkaline electrolyte arranged between the first electrode and the second electrode. The separator, the first electrode and the second electrodes are configured to allow exchange of hydrogen and oxygen by allowing gas to migrate between the two electrodes. Each battery module 10, 10', comprises a positive terminal 11 and a negative terminal 18, which are in electrical contact with the at least one battery cells 12 in each battery module, wherein the battery cells are preferably series connected. The positive terminal 11 of a first module 10 constitutes the positive terminal of the battery pack 100, as indicated by the plus sign, and the negative terminal 18 of the last module 10' constitutes the negative terminal of the battery pack 100, as indicated by the negative sign.

The battery pack 100 is also configured to connect the gas space of each battery module 10, 10' to create a common gas space 29. The battery pack 100 further comprises a gas inlet 25 for adding a gas or a liquid to the common gas space 29. Also shown in FIG. 1 is a measuring unit 13, which is connected to the positive terminal 11 and to the negative terminal 18 of each battery module, and which is configured to obtain data necessary to calculate an indicative parameter related to the internal resistance of the battery modules 10, 10', between the positive terminal connector and the negative terminal connector, as explained above. The data obtained by the measuring unit 13 may comprise voltage drop during discharge to determine the internal resistance, temperature, internal pressure, and current in case a current sensor is included within the measuring unit 13. The measuring unit 13 may also be configured to measure the open circuit voltage, OCV, between the positive terminal 11 and the negative terminal 18 in each battery module 10, 10'. As an alternative it would be possible to connect the measuring unit 13 to obtain the data for only one battery cell 12. However, it is very costly to manufacture a battery module with this functionality. An inlet valve 16 is connected to the gas inlet 25. In FIG. 1 an optional gas container 17 is connected to the inlet valve 16. A local control unit 20 is connected to the measuring unit 13 and to the inlet valve 16, and the local control unit may be configured to calculate the indicative parameter based on the data provided from the measuring unit 13. A safety valve 24, for instance a bursting disc, is connected to the common space 29. The safety valve prevents dangerous gas pressures to build up in the common gas space 29. A pressure sensor 23 may also be attached to the safety valve 24 to measure the internal pressure in the common gas space 29. The pressure sensor 23 is also connected to the local control unit 20.

The local control unit 20 is in communication with a control unit 14, either by wire or wirelessly connected. It is also possible to have one or more intermediate units in between the local control unit 20 and the control unit 14. It is also possible to omit the local control unit and have the control unit 14 connected directly to the inlet valve 16 and to the measuring unit 13. The control unit 14 may be located at a remote location such as at, e.g., the battery module manufacturer. The central control unit 14 is connected to or comprises a memory 26.

The control unit 14 is configured to initiate measurements with the measuring unit 13, at predetermined intervals, of temperatures, pressure, voltages and currents needed to calculate the indicative parameters, such as the internal resistance between the positive terminal 11 and the negative terminal 18, of each battery module 10, 10', and to send this information to the control unit 14 together with information identifying the battery module 10, 10'. To achieve this, the control unit 14 sends a request to the local control unit 20, which returns as answer information related to the current indicative parameter of the battery modules 10, 10', and optionally also the open circuit voltage over the battery modules 10, 10'. The internal resistance is not directly measured by the measuring unit 13. It measures the voltage drop during a discharge with a predetermined discharge current and then the internal resistance is calculated, as described above.

During use of the battery module 10, 10', the battery module is discharged and charged via the terminals of the battery pack, marked with plus and minus signs in the figure. The internal resistance of the battery module increases for an increasing number of charges and discharges.

In a first example (not shown), the battery module 10 is a standalone battery module with a housing creating a gas space for all battery cells within the battery module, as disclosed in the published application WO2006/104442 or WO 2007/093626 assigned to the present applicant. In the stand alone battery module, the cells are configured in a bipolar configuration. The cells in this example are series connected with biplates, to form a stack of battery cells. The battery module has a casing containing the battery cells and enclosing a gas space. A connection tube will have to be provided to connects the gas spaces of the battery modules into a common gas space.

In a second example (not shown), the battery modules are series connected in a bipolar manner. In that case, the battery modules are electrically connected by placing the positive terminal of a first battery module 10 against the negative terminal of a second module 10' thereby using the whole surface of the respective endplates to minimize the resistance when serial-connecting two battery modules. A connection tube is not required. Instead a sealing O-ring is placed between the modules to ensure a sealed configuration between the gas space within each battery module. These types of battery modules are disclosed in WO 2018/111182 assigned to the present applicant.

Figure 2:
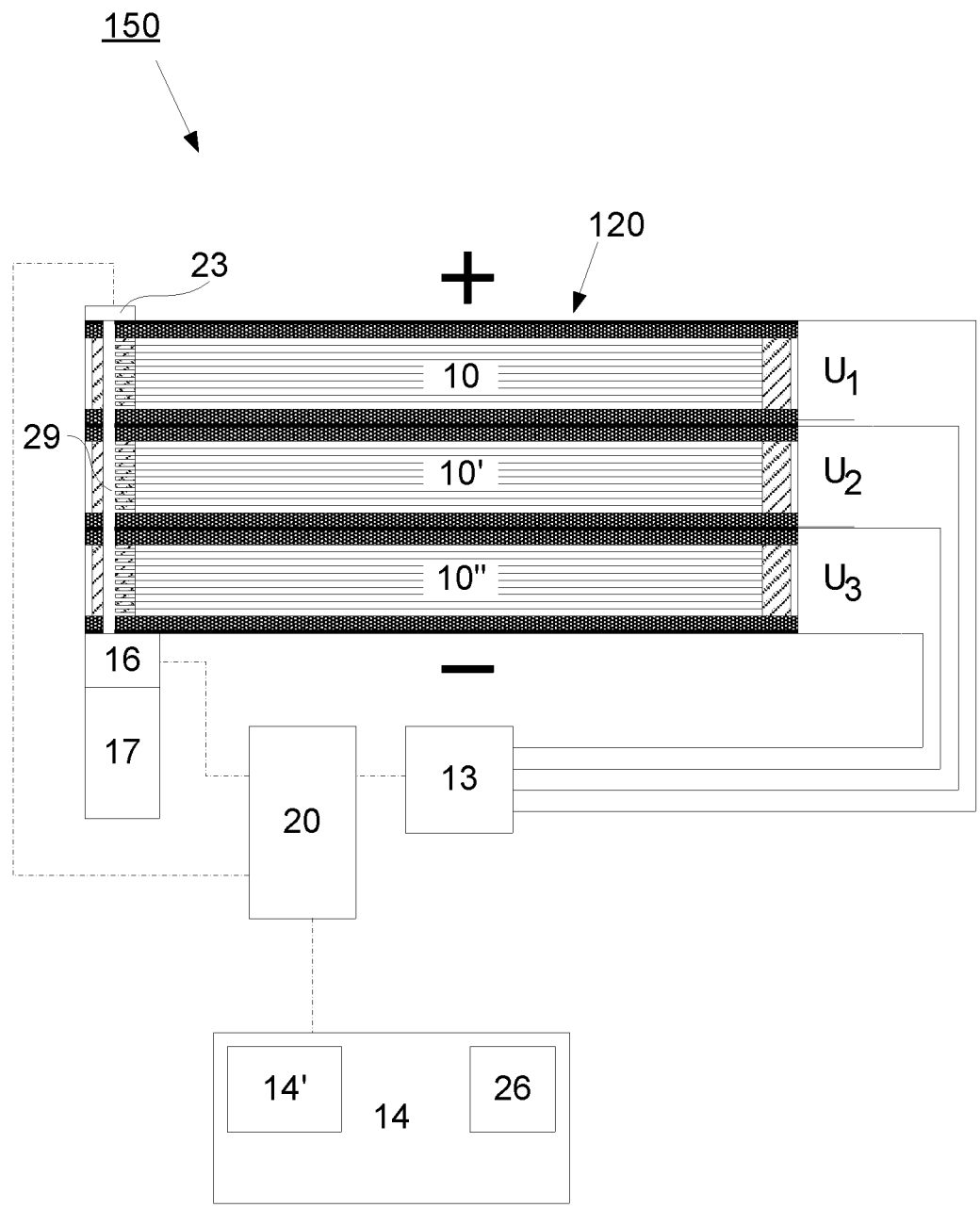
FIG. 2 illustrates a battery system for balancing a battery pack comprising three battery modules.

FIG. 2 shows a battery system 150 comprising a battery pack 120 according to an alternative embodiment of the present invention. In the embodiment of FIG. 2 three battery modules 10, 10', 10", are connected in series to form a battery pack 120. The battery pack 120 also comprises sealing rings (not shown) which connect the gas spaces of the battery modules 10, 10', 10", into a common gas space 29. The battery pack 120 further comprises a gas inlet for adding a gas or a liquid to the common gas space 29. An inlet valve 16 is connected to the gas inlet. An optional gas container 17 is connected to the inlet valve 16. A safety valve (not shown) may be connected to the common space 29 and a pressure sensor 23 may be provided to measure the internal pressure within the common gas space 29.

The battery system further comprises a local control unit 20 connected to the measuring unit 13 and to the inlet valve 16. The safety valve prevents dangerous gas pressures to build up in the common gas space 29. Each battery module 10, 10', 10", also comprises a positive terminal, and a negative terminal. The electrical connections between the different battery modules 10, 10', 10", are provided via a contact plate positioned between the battery modules.

The local control unit 20 may also be connected to the pressure sensor 23 and the local control unit 20 is in communication with a control unit 14, in this example by wire. It is also possible to have one or more intermediate units in between the local control unit 20 and the control unit 14. It is also possible to omit the local control unit and have the control unit 14 connected directly to the pressure sensor 23, the inlet valve 16 and to the measuring unit 13. As mentioned before, the control unit 14 may be located at a remote location such as at, e.g., the battery module manufacturer. The central control unit 14 comprises in this example a memory 26. The measuring unit is configured to obtain data necessary to determine indicative parameters, such as a first internal resistance $R_{i1}$ and optionally a first open circuit voltage $U_1$ between the terminals of the first battery module 10, a second internal resistance $R_{i2}$ and optionally a second open circuit voltage $U_2$ between the positive terminals of the second battery module 10', and a third internal resistance $R_{i3}$ and optionally a third open voltage voltage $U_3$ between the positive terminals of the third battery module 10". Internal resistance is calculated based on the voltage drop during a discharge current (as explained above). An average internal resistance $R_{ic1}$ per battery cell for the first battery module 10 is determined by dividing the measured internal resistance $R_{i1}$ with the number, i.e., ten battery cells in the first battery module 10. Internal resistances $R_{ic2}$, $R_{ic3}$, per battery cell for the second battery module 10' and the third battery module 10", are calculated similarly. It should be noted that the indicative parameter related to internal resistance is temperature dependent and it is necessary for the measuring unit to measure each module temperature, or at least the pack temperature, to calculate the internal resistance correctly.

Figure 3:
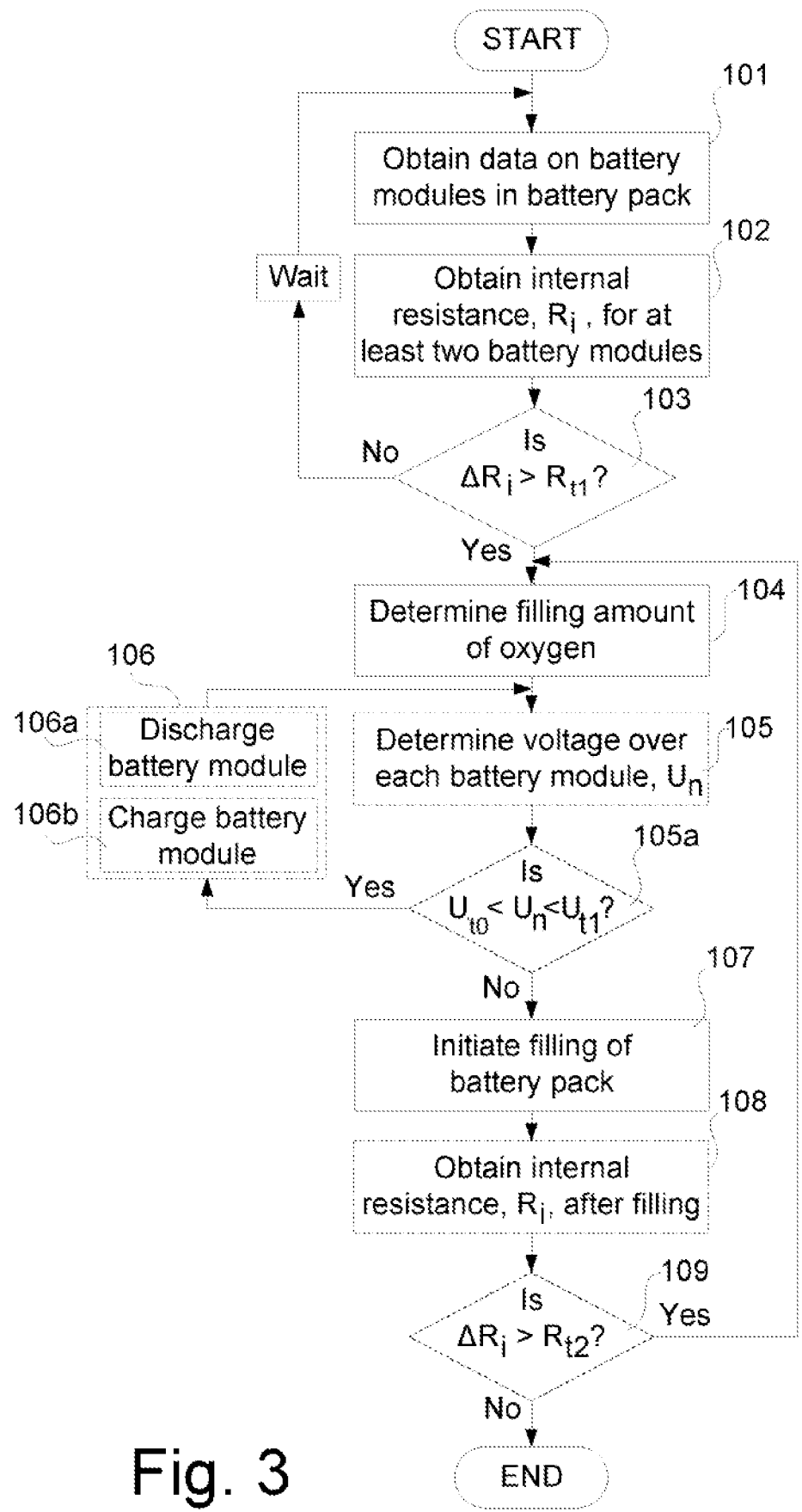
FIG. 3 shows a flow diagram over a method, according to an embodiment, for balancing of the battery module.

FIG. 3 shows a flow diagram of a method for balancing a plurality of battery modules in a battery pack. The method comprises the first step 101 of obtaining data on the battery pack. This may be done in many different ways. An example on how the data may be obtained is that the local control unit sends a unique identification number to the control unit. The control unit may then retrieve data on the battery pack from the memory. In a second step 102 the indicative parameters, here exemplified as the internal resistance Ri, of at least two of the battery modules is obtained, e.g. $R_{i1}$ and $R_{i3}$. According to one embodiment, data to calculate the internal resistance is obtained from the measuring unit, and a control circuitry (e.g. the local control unit 20) determines the resistance between the positive terminals of each battery module. The local control unit then sends data related to the internal resistance to the control unit, either the calculated internal resistance for each battery module, $R_{i1}$, $R_{i2}$, $R_{i3}$ or information regarding the measurement of the voltage drop at a certain discharge current.

In a third step 103 the control unit 14 determines whether the difference in internal resistance between any of the two battery modules exceeds a predetermined first resistance threshold $R_{t1}$ corresponding to a first resistance threshold per cell $R_{tc1}$ at the measured battery pack and/or battery module temperatures. The control unit may calculate the average internal resistance, $R_{ic}$, per battery cell for each battery module, which is necessary when the battery modules comprises different number of battery cells. However, if the battery modules comprises the same number of battery cells, that step may be omitted.

According to some embodiments, the indicative parameter for each battery module needs to be above a common threshold, e.g. a level corresponding to at least twice the internal resistance when the battery module was new, in order for process to balance the battery modules in the battery pack to be carried out. For instance, if the internal resistance was 6 mcl when new, the common threshold may be selected to be at least 12 mcl.

Thus, for battery modules with the same number of battery cells, the determination in step 103 may be performed by comparing the absolute difference in internal resistance between two battery modules, e.g. modules 10 and 10", with a predetermined first resistance threshold $R_{t1}$, i.e. $\Delta R_i = |R_{i1} - R_{i3}| > R_{t1}$. Alternatively, the comparison is calculated between any of the at least two battery modules 10, 10' and 10" to determine if any difference exceeds the predetermined first resistance threshold $R_{t1}$, based on the internal resistances $R_{i1}$, $R_{i2}$, $R_{i3}$, of the battery modules.

In case the battery modules have different number of battery cells, it is necessary to calculate the average internal resistance per battery cell for each battery module, i.e. $R_{ic1}$, $R_{ic2}$, $R_{ic3}$, and step 103 will be performed by comparing the absolute difference in average internal resistance between two battery modules, e.g. modules 10 and 10", with the first predetermined cell resistance threshold value $R_{tc1}$, e.g. $\Delta R_{ic} = |R_{ic1} - R_{ic3}| > R_{tc1}$. Alternatively the comparison is calculated per battery cell between any of the at least two battery modules to determine if any difference exceeds the predetermined first cell resistance threshold value $R_tn$, based on the average internal resistances $R_{ic1}$, $R_{ic2}$, $R_{ic3}$, of the battery modules.

The first resistance threshold $R_{t1}$ may be stored in the memory 26 or be implemented in the method, i.e., in a computer program controlling the execution of the method. If the calculation in step 103 is performed for average internal resistance in battery modules, the first cell resistance threshold $R_{tc1}$ needs to be determined based on the first resistance threshold value $R_{t1}$ for each battery cell together with the data on the battery pack, i.e. the number of battery cells in each battery module. In more detail, the control unit receives an identification number from the local control unit 20 and retrieves data on the battery module from the memory. This data may be that the battery pack comprises ten battery cells in each battery module, and that the battery pack comprises three battery modules, as in the battery pack 120 shown in FIG. 2.

Information regarding the energy capacity of each battery cell, and the number of battery cells, and optionally the volume of the common gas space, is forwarded to the control unit from the memory. The control unit may then divide the obtained resistance with the number of battery cells to arrive at an average internal resistance $R_{ic1}$, $R_{ic2}$ per battery cell for each one of said two battery modules. In case the absolute difference in internal resistance from two different battery modules does not exceed the predetermined first resistance threshold $R_{t1}$, or alternatively the average internal resistance per battery cell from two different battery modules does not exceed the predetermined first cell resistance threshold value $R_{tc1}$, the control unit waits during a waiting time $T_w$ for the next opportunity to obtain an updated value of the internal resistance of the battery modules.

In case the absolute difference in internal resistance $\Delta R_i$ from any two different battery modules, exceeds the predetermined first resistance threshold value $R_{t1}$, the control unit determines, based on the internal resistances $R_{i1}$, $R_{i2}$, $R_{i3}$, of the battery modules and the data on the battery pack, a filling amount of oxygen (step 104) to be filled into the battery pack in order to reduce the difference in internal resistance $R_{i1}$, $R_{i2}$, $R_{i3}$, between any two battery modules to reduce the difference to a level below the first resistance threshold value $R_{t1}$, or preferably below a predetermined second resistance threshold value $R_{t2}$, wherein the second threshold is lower than the first threshold, $R_{t1} > R_{t2}$. Alternatively this is performed using the average internal resistance in case the battery modules contain different number of battery cells. The data used in the determination of the necessary amount of oxygen preferably relates to information on the energy capacity of each battery cell and the number of battery cells within each battery module, and optionally on the volume of the common gas space. The necessary amount of oxygen may be determined in many different ways as explained below.

According to one alternative the control unit relies on earlier measurements to obtain the necessary amount of oxygen to be filled into the common space of the of the battery pack. The control unit may consult a look-up table in the memory to retrieve the data on the battery pack corresponding to the identification number of the battery pack. The data on the battery pack may in one example be a type number identifying the type of battery pack. The control unit may then retrieve from a different look-up table the necessary amount of oxygen based on the measured resistance and the type number. The necessary amount of oxygen in the look-up table may in turn be based on earlier experiments with a similar battery pack type.

According to another alternative the control unit obtains from the look-up table data necessary to calculate the amount of oxygen. The data in the look-up table may be the number of battery cells in each battery module, the number of battery modules in the battery pack, and the energy capacity of each battery cell, and optionally the volume of the common gas space.

The method may also comprise an optional step 105 of obtaining a voltage indication over each of the at least two battery modules $U_n$ where n is equal to the number of battery modules in the battery pack, e.g. $U_1$, $U_2$, $U_3$. The voltage indication may be an open circuit voltage, OCV, over the battery module or a state of charge, SOC, measure indicating the that it is safe to add oxygen to the battery module. In this example OCV will be used and the determination in step 105 is performed by measuring the open circuit voltage over the battery module, $U_n$, and a subsequent optional step of determining 105a whether the voltage over each battery module for the at least two of the battery modules, is within a predetermined voltage interval, $U_{t0}<U_n<U_{t1}$. Alternatively, step 105 is determined per battery cell, $U_{ct}$, e.g. when the battery modules contain different number of battery cells. In this case it is necessary for the control unit 14 to have information on the number of battery cells included in the voltage measurement to obtain an average battery cell voltage and compare it with a predetermined cell voltage threshold $U_{ct}$.

As is shown in the embodiments of FIGS. 1 and 2 the voltage measurements are normally only performed over entire battery modules. If it is determined that the module voltage $U_n$ does not exceed the predetermined voltage threshold $U_t$ it is determined that it is safe to fill oxygen into the battery pack. On the other hand if the battery module voltage is not within the voltage interval, the optional step of adjusting 106 the module voltage of the battery module by charging or discharging the battery pack, is performed before repeating step 105. This means that if the battery module voltage is higher than or equal to an upper voltage indication threshold, $U_n \geq U_{t1}$, the battery pack is discharged (step 106a) and if the battery module voltage is lower than or equal to a lower voltage indication threshold $U_n \leq U_{t0}$, the battery pack is charge (step 106b). It is advantageous to perform these optional steps, 105, 105a and 106, in order to reduce the risk for fire in case oxygen is filled into the battery pack when the voltage over the battery cells is too high, this may be caused by the fact that the oxygen recombination rate becomes too high at high voltages over the battery cells. If the battery module voltage becomes too low the oxygen reacts directly with the negative electrode that is unprotected from intercalated hydrogen.

Figure 4:
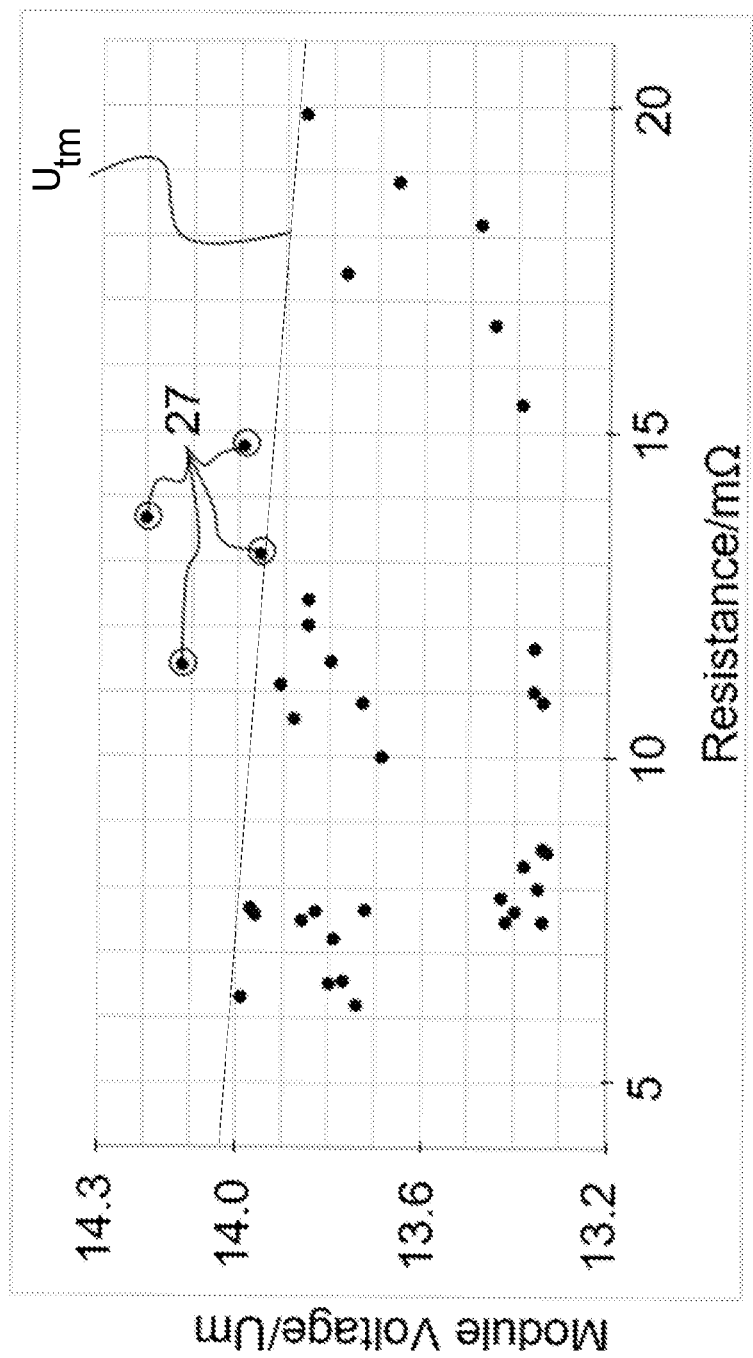
FIG. 4 shows a diagram in which different measurements of the resistance and the voltage have been plotted.

FIG. 4 is a diagram over a plurality of measurements plotted for the resistance over a battery module $R_{in}$ at room temperature, i.e. 20° C.±2° C. and the corresponding open circuit voltage, OCV, $U_n$ over the nth battery module. The data in FIG. 4 is for a NiMH battery module with ten battery cells. The voltage threshold for the module, $U_t$, is a function of the resistance over the battery module, $R_{in}$, as is illustrated in FIG. 4. The four encircled dots 27 indicate measurements for which the voltage is too high for filling oxygen.

As mentioned above, in case it is determined not to be safe to fill the battery pack with oxygen the method may comprise the optional intermediate step 106 of adjusting the battery module voltage of the battery module. This is performed by charging or discharging the battery pack to a voltage to ensure that the open circuit voltage over each battery module in the battery pack is within the indicated voltage interval, before initiating filling of the battery pack, step 107, with the determined amount of oxygen. As an example, the upper voltage indication threshold is 1.39 V/cell and the lower voltage indication threshold is 1.3 V/cell at a temperature of +20° C.±2° C. The upper voltage indication voltage threshold, as well as the lower indication voltage threshold, are temperature dependent and may be normalized to a predetermined temperature range (such as room temperature) in order to be able to ensure that the OCV is within the voltage interval 1.3-1.39 V/cell. Otherwise, threshold values for different temperatures needs to be available to determine that it is safe to fill the battery module with oxygen.

In case SOC are used to determine if the battery module is safe to be filled with oxygen, the upper SOC threshold is 95% and the lower SOC threshold is 50%.

The battery module 10, 10', 10", may be filled with an inert gas at the same time as the battery module is filled with oxygen, which reduces the risk of fire during filling. The filling is illustrated in FIG. 1 with a gas container 17 which is connectable to the gas inlet 25 via the inlet valve 16. The control unit 14 may be configured to initiate the filling by initiating the sending of the container 17 to the site of the battery module 10, 10', 10".

According to some embodiments, the step of initiating filling of the battery pack may also comprise the step of adding hydrogen gas to the common gas space before filling the battery pack with oxygen, which further improves the operational efficiency of the battery module. However, this step can only be performed when the voltage indication is within the voltage indication interval, and the battery module is safe to be filled with oxygen.

As a measure of precaution, after filling of the battery module with oxygen in step 107, the method optionally includes an eighth step 108, in which the control unit 14 obtains an after filling parameter related to the internal resistance after filling of said at least two battery modules 10, 10', 10" in the battery pack. In an optional ninth step 109 it is determined whether the difference in internal resistance between any two battery modules 10, 10', 10", exceeds a predetermined second threshold value, for instance a second resistance threshold value Rte. If this is the case the method returns to step 104, wherein an additional amount of oxygen to be filled into the battery pack is determined in order to reduce the difference in after filling parameters between two of the at least two battery modules in the battery pack 100 to a level below the second resistance threshold Rte. The additional amount is the amount of oxygen to be filled into the battery pack in step 107. These optional steps provide a more robust method as it will allow more cycles of the battery before the internal resistance of the battery modules $R_{i1}$, $R_{i2}$, $R_{i3}$, again exceeds the first resistance threshold $R_{t1}$. The optional feedback loop from step 109 to step 104 should in principle not be required, but in case it is necessary to fill any additional oxygen into the battery pack, the battery pack is filled with the determined amount of oxygen. In order for this step to be meaningful it is necessary that the filling of oxygen may be performed more or less instantly. In case a container 17 has to be sent for filling there might be a delay of hours to days until the battery pack is filled with oxygen.

In case the method aims at obtaining a difference in internal resistance between any two different battery modules, e.g. 10, 10", below the second resistance threshold, the absolute difference in internal resistance per battery module $\Delta R_i = |R_{i1} - R_{i3}|$ between two different battery modules 10 and 10", should be below the second resistance threshold $R_{t2}$, $\Delta R_i < R_{t2}$.

The step of determining 109 may be replaced with a QA step, since the internal resistance is determined as part of the QA step.

It is possible that the control unit performs the step 101 of obtaining data on the battery pack differently depending on the length of the time that has elapsed from the last time the data was obtained. The data may be stored in a working memory of the control unit 14 for a short time.

In the above description it has been described how a control unit 14 may perform the method. The control unit may comprise at least one processor 14' (FIG. 1). The processor may be programmed with a computer program comprising instructions which, when executed on the at least one processor, cause the at least one processor to carry out the method for improving the operational efficiency of a battery pack. The method at the control unit may be computer implemented.

EXAMPLES

Figure 5:
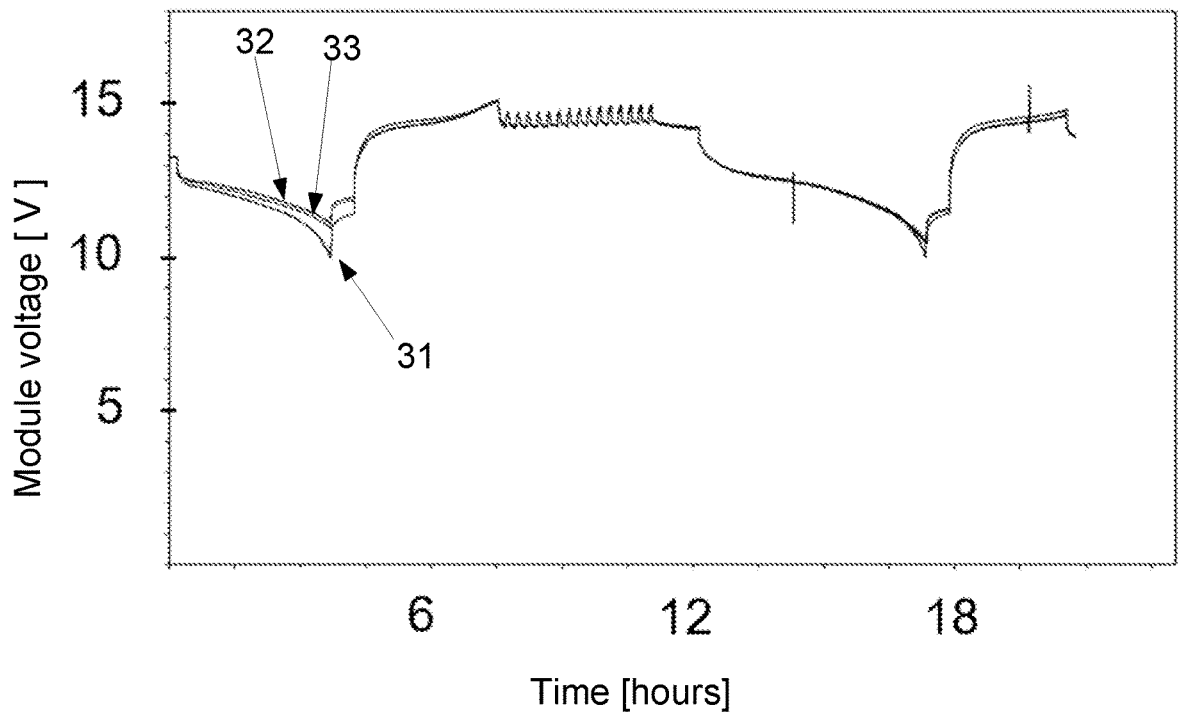
FIG. 5 illustrates how the voltage over the battery cells, in a battery pack according to FIG. 2, varies during a cycle for quality assurance of the battery before oxygen filling.

FIG. 5 illustrates how the voltage over the battery cells, in a battery pack according to FIG. 2, varies during a cycle for quality assurance of the battery before oxygen filling.

Figure 6:
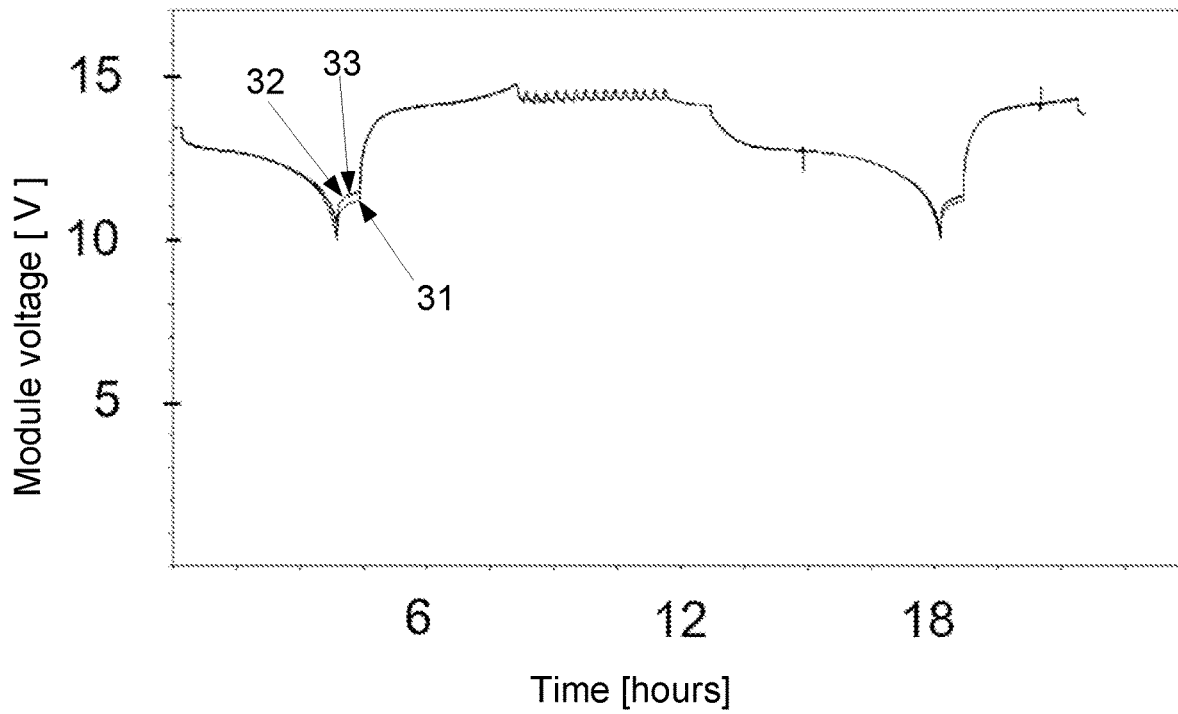
FIG. 6 illustrates how the voltage over the battery cells, in a battery pack according to FIG. 2, varies during a cycle for quality assurance of the battery after oxygen filling.

FIG. 6 illustrates how the voltage over the battery cells, in a battery pack according to FIG. 2, varies during a cycle for quality assurance of the battery after oxygen filling.

The following table comprises details on the filling of oxygen (one example of the step of initiating filling of the battery pack, step 107 in FIG. 4) into the battery pack and details on the internal resistance per battery cell for the different battery modules.

in a battery pack. The difference in the fifth column refers to the difference in internal resistance $R_{ic1}$, $R_{ic2}$, $R_{ic3}$, per battery cell between the first battery module 10 and the third battery module 10". The reason for this choice is that the largest difference in internal resistance $R_{ic1}$, $R_{ic2}$, $R_{ic3}$, per battery cell, after the fourth filling of oxygen is largest between the first battery module 1 and the third battery module 3, corresponding to battery modules 10 and 10" in FIG. 2.

Before the first filling of oxygen a quality assurance cycle is performed as is shown in FIG. 5. The first voltage curve 31 for the first battery module 1 is clearly separated from the second voltage curve 32 for the second battery module 2 and the third voltage curve 33 for the third battery module 3. This is due to the large difference between the average internal resistance per battery cell $R_{ic1}$ for the first battery module 1 and the average internal resistance per battery cell $R_{ic2}$, $R_{ic3}$, for the second and third battery modules. The second voltage curve 32 and the third voltage curve 33 are close to each other due to their similar the average internal resistance per battery cell $R_{ic2}$, $R_{ic3}$.

After the fourth filling of oxygen into the battery pack 120 the difference in internal resistance $R_{ic1}$, $R_{ic2}$, $R_{ic3}$, per battery cell, between the different battery modules, is considerably smaller as is evident from the last row of the table above. This small difference is also evident from FIG. 6 in which the first voltage curve 31, the second voltage curve 32 and the third voltage curve 33 are very close to each other. The step denoted repeat QA are steps of repeating a quality assurance, including charging and discharging of the battery modules.

Figure 7:
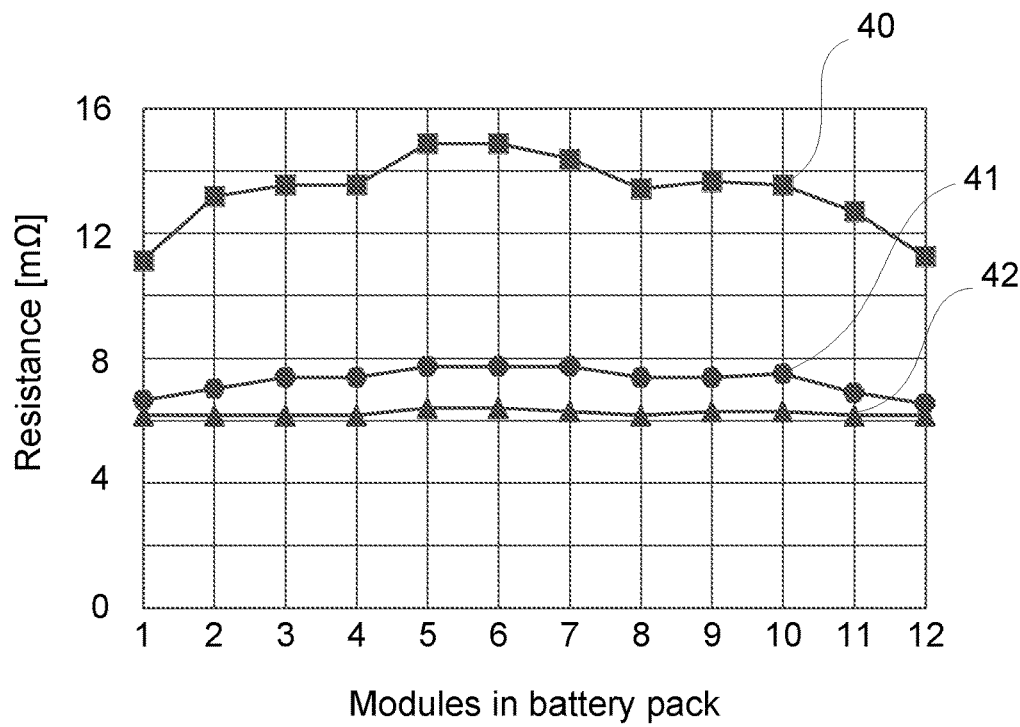
FIG. 7 shows a first example illustrating how the internal resistance changes when balancing a battery pack.

FIG. 7 shows a first example illustrating how the internal resistance changes when balancing a battery pack. In Table 2 below, resistance measurements for the battery pack, which are used as data to determine the required filling amount to balance the battery are expressed as average K-factor and its standard deviation. The K-factor reflects the increase in average internal resistance from the initial average resistance of the battery pack. As an example, the K-factor of 2.5 represents an increase in internal resistance from 4 mΩ to 10 mΩ.

Furthermore, equation (1) has been used to determine the required filling mount of oxygen:

$$Y = (C_1 \cdot x - C_2) \cdot M \qquad (1)$$

wherein Y is the filling amount of oxygen in liters, $C_1$ and $C_2$ are constants, x is the average K-factor of the battery pack and M is the number of modules in the battery pack. The constants are determined based on the data of the battery modules such as number of battery cells in each battery module and battery capacity. In this example $C_1 = 5.8958$, $C_2 = 5.3106$ and $M = 12$ resulting in equation (2)

$$Y = (5.8958 \cdot x - 5.3106) \cdot 12 \qquad (2)$$

TABLE 1

| Battery pack | Module 1 (mΩ/cell) $R_{ic1}$ | Module 2 (mΩ/cell) $R_{ic2}$ | Module 3 (mΩ/cell) $R_{ic3}$ | Resistance difference $\Delta R_i$ | Pack resistance (mΩ/cell) | Capacity (Ah) |
|---|---|---|---|---|---|---|
| Start | 18.75 | 15.36 | 15.54 | 3.21 | 16.53 | 11.41 |
| Add 9.8 liter O2 | 15.96 | 12.70 | 12.97 | 2.99 | 13.87 | 12.24 |
| Add 9 liter O2 | 11.98 | 9.56 | 9.92 | 2.06 | 10.48 | 12.03 |
| Add 9 liter O2 | 10.28 | 8.59 | 8.83 | 1.45 | 9.18 | 11.82 |
| Repeat QA | 10.28 | 8.83 | 8.83 | 1.45 | 9.27 | 12.03 |
| Add 9 literO2 | 8.47 | 7.74 | 7.62 | 0.85 | 7.94 | 11.01 |

In table 1 above the resistance per battery cell for the different battery modules 1-3 are shown at different times during balancing the of the battery pack 120. As can be seen from the first column oxygen is added in four steps. Before the first step the internal resistance $R_{ic1}$, $R_{ic2}$, $R_{ic3}$, per battery cell is obtained with the battery modules connected

TABLE 2

| | K-factor | | Oxygen [liter] | | Resistance |
|---|---|---|---|---|---|
| | Average | Standard deviation | Calculated amount | Filled amount | Difference $\Delta R_i$ [mΩ] |
| Initial values | 1.0 | 0.020 | | | 0.419 |
| After cycling | 2.62 | 0.224 | 121.3 | | 3.750 |
| First oxygen filling | | | | 72 | |
| After first filling | 1.44 | 0.078 | 37.9 | | 1.210 |
| Second oxygen filing | | | | 40 | |
| After second filling | 1.23 | 0.018 | | | 0.242 |

The process of filling the battery pack may be initiated when the difference in internal resistance ($\Delta R_i = R_{max} - R_{min}$) is larger than a predetermined value, or when the standard deviation of the internal resistance exceeds a predetermined value. In this example when $\Delta R_i > 3.5$ mΩ (as illustrated by curve 40 of FIG. 7) the process was activated and the required amount of oxygen was calculated. In this example, the maximum filling amount of oxygen has been limited to 72 liters, and is therefore performed in two steps. The result after the first filling of 72 liters is illustrated by curve 41, and an additional amount of oxygen is calculated after the first filling (37.9 liters) resulting in a second filling of 40 liters. The result after the second filling of 40 liters is illustrated by curve 42. In Table 2, it may be seen that the standard deviation of the internal resistance has been reduced to a level below the initial standard deviation 0.020 and the battery pack is considered to be balanced.

Figure 8:
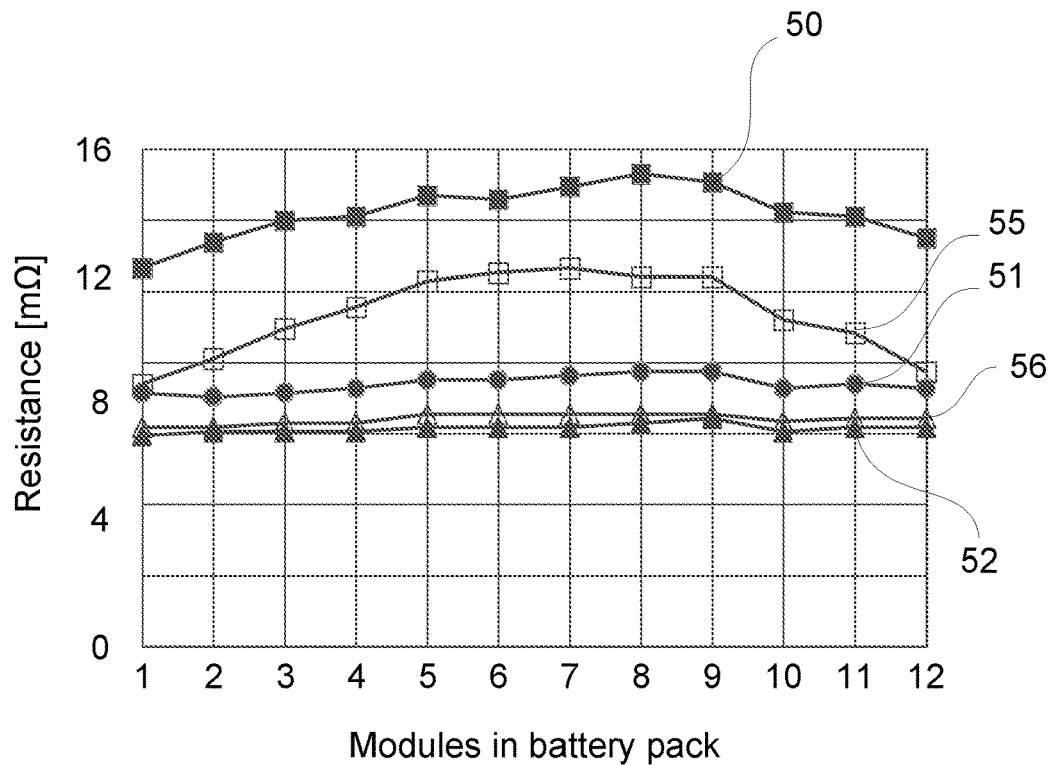
FIG. 8 shows a second example illustrating how the internal resistance changes when balancing a battery pack.

FIG. 8 shows a second example illustrating how the internal resistance changes when balancing a battery pack. Equation (2) has been used to calculate the amount of oxygen to be filled and Table 3 shows the result from the resistance measurements for the battery pack, the calculated filling amount to balance the battery pack, the filled amount and deviation in internal resistance.

TABLE 3

| | K-factor | | Oxygen [liter] | | Resistance |
|---|---|---|---|---|---|
| | Average | Standard deviation | Calculated amount | Filled amount | Difference $\Delta R_i$ [mΩ] |
| Initial values | 1.0 | 0.040 | | | 0.708 |
| After first cycling | 2.42 | 0.147 | 107.8 | | 2.661 |
| First oxygen filling | | | | 53 | |
| After first filling | 1.46 | 0.046 | 39.9 | | 0.726 |
| Second oxygen filling | | | | 40 | |
| After second filling | 1.22 | 0.024 | | | 0.484 |
| After second cycling | 1.86 | 0.219 | 67.6 | | 3.266 |
| Oxygen filling | | | | 68 | |
| After oxygen filling | 1.26 | 0.027 | | | 0.363 |

In this example when $\Delta R_i > 2.5$ mΩ (as illustrated by curve 50 of FIG. 8) the process was activated and the required amount of oxygen was calculated. The calculated volume of 107.8 liters is more than the capacity of the filling equipment, the filling step is therefore performed in two separate steps wherein the amount to be filled in a first filling step has been selected to be approximately half of the calculated amount, i.e. 53 liters. The result after the first filling of 53 liters is illustrated by curve 51, and an additional amount of oxygen is calculated after the first filling (39.9 liters) resulting in a second filling of 40 liters. The result after the second filling of 40 liters is illustrated by curve 52. In Table 3, it may be seen that the standard deviation of the internal resistance has been reduced to a level below the initial standard deviation 0.040 after the second filling and the battery pack is considered to be balanced.

The battery pack was thereafter cycled and the internal resistance in the battery pack increases and the difference in internal resistance between the battery modules also increases until it exceeds 2.5 mΩ (as illustrated by curve 55 of FIG. 8). The required oxygen amount was calculated to 67.6 liters to balance the battery pack. The result after the third filling of 68 liters is illustrated by curve 56. In Table 3, it may be seen that the standard deviation of the internal resistance has been reduced to a level below 0.030 after the third filling and the battery pack is considered to be balanced.

The present disclosure relates to a method for improving the operational efficiency of a battery pack comprising at least two battery modules 10, 10', 10", wherein each battery module comprises at least one battery cell. Each battery module has a casing encompassing the at least one battery cell and enclosing a gas space, wherein the gas spaces of the battery modules are connected to each other to form a common gas space 29. Each battery cell comprises a first electrode, a second electrode, a porous separator, and an aqueous alkaline electrolyte arranged between the first electrode and the second electrode, and the porous separator, the first electrode and the second electrode are configured to allow exchange of hydrogen and oxygen by allowing gas to migrate between the electrodes. At least one of the casings comprises a gas inlet for adding a gas or a liquid to the common gas space. The method comprises the steps of: obtaining data on the battery modules, wherein the data relates to the number of battery cells per battery module and the number of battery modules, temperature of each battery module, and the energy capacity of the battery modules (10, 10', 10"); obtaining an indicative parameter related to an internal resistance $R_{i1}$, $R_{i2}$, $R_{i3}$ for at least two of the battery modules (10, 10', 10"); determining 104, in case the difference in indicative parameters between the battery modules exceeds a predetermined first threshold value, based on the indicative parameter and the data on the battery module, a filling amount of oxygen to be filled into the battery module in order to obtain a difference in indicative parameter between any two battery modules to a level below the first threshold value; and—initiating filling of the battery pack based on the determined filling amount of oxygen.

According to some embodiments, the indicative parameter is selected to be the internal resistance $R_{i1}$, $R_{i2}$, $R_{i3}$ for the at least two of the battery modules 10, 10', 10", and the first threshold value is a first resistance threshold $R_{t1}$, wherein the filling of oxygen into the battery pack reduces the difference in internal resistance between any of the at least two of the battery modules 10, 10', 10" to a level below the first resistance threshold $R_{t1}$.

According to some embodiments, the indicative parameter is related to state of health, SOH, of the battery module.

According to some embodiments, the indicative parameter for the battery module 10, 10', 10" and the first threshold value are determined per battery cell based on the indicative parameter of each battery module and the obtained number of battery cells in each battery module.

According to some embodiments, the method further comprising the steps of: obtaining 105 a voltage indication $U_1$, $U_2$, $U_3$ over each of the at least two battery modules 10, 10', 10"; determining 105a whether the voltage indication $U_1$, $U_2$, $U_3$ over any of the at least two battery modules exceeds a predetermined upper voltage indication threshold $U_{t1}$; and performing the step of filling 107 when the obtained voltage indication of each of the at least two battery modules is lower than the predetermined upper voltage indication threshold $U_{t1}$ prior to the step of initiating 107 filling of the battery pack with the determined filling amount of oxygen.

According to some embodiments, the predetermined voltage indication threshold $U_{t1}$ is a function of the indicative parameter related to the internal resistance $R_{i1}$, $R_{i2}$, $R_{i3}$ for the at least two battery modules 10, 10', 10".

According to some embodiments, the method further comprising, when the obtained voltage indication over any of the at least two battery modules is equal to or higher than the predetermined upper voltage indication threshold $U_{t1}$, the steps of: discharging 106a the battery pack to reduce the voltage over the at least two battery modules 10, 10', 10" to a level below the predetermined upper voltage indication threshold prior to initiating 107 filling of the battery pack with the determined filling amount of oxygen.

According to some embodiments, the method further comprising the steps of: determining 105a whether the voltage indication over any of the at least two battery modules 10, 10', 10" is lower than or equal to a predetermined lower voltage indication threshold $U_{r0}$; and performing the step of initiating filling 107 when the obtained voltage indication over each of the at least two battery modules exceeds the predetermined lower voltage indication threshold ($U_{r0}$).

According to some embodiments, the method further comprising, when the obtained voltage indication over any of the at least two battery modules 10, 10', 10" is lower than or equal to the predetermined lower voltage indication threshold $U_{r0}$, the step of charging 106b the battery pack to increase the voltage over the at least two battery modules 10, 10', 10" to a level above the lower voltage indication threshold $U_{r0}$, prior to performing the step of initiating filling 107 of the battery module with the determined filling amount of oxygen.

According to some embodiments, the step of initiating filling 107 further comprises filling the battery pack with hydrogen prior to filling the at least two battery modules with oxygen.

According to some embodiments, the voltage indication is selected to be an open circuit voltage over the at least two battery modules, and the upper and lower voltage indication threshold are temperature dependent.

According to some embodiments, the voltage indication is related to State of Charge, SOC, of the battery module.

According to some embodiments, the filling of the battery pack 100; 150 with an inert gas in conjunction with filling of the battery pack 100; 150 with oxygen.

According to some embodiments, the inert gas is selected to be any combination of: Argon, Nitrogen, Helium and/or air.

According to some embodiments, the step of initiating filling 107 further comprising the step of initiating the preparation of a container 17 with the determined filling amount of oxygen to reduce the difference in indicative parameter between the at least two battery modules. The pressure of the gas in the container depends on the volume of the container and the amount of gas in the container. For a small container the amount of gas in the container is approximately the same as the filling amount of oxygen. However, after filling of oxygen from a container a residual amount of oxygen will always remain in the container. The flow of gas from the container to the battery module will continue until the pressure in the container is the same as the pressure in the common gas space of the battery module. Thus, the container amount of gas must be slightly larger than the filling amount.

According to some embodiments, the steps, after filling of the battery pack with oxygen, of: obtaining 108 an after filling parameter related to the internal resistance $R_{i1}$, $R_{i2}$, $R_{i3}$ after filling of the battery pack, determining 109, whether the difference in after filling parameter between any of the at least two battery modules 10, 10', 10" exceeds a predetermined second threshold value, determining, in case the difference in after filling parameter between any of the battery modules exceeds the second threshold value, based on the after filling parameter of the battery modules and the data on each battery module, an additional filling amount of oxygen to be filled into the battery pack in order to reduce the difference in after filling parameter between any two battery modules to a level below the second resistance threshold $R_{t2}$; and filling the battery pack with the determined additional amount of oxygen.

According to some embodiments, the method is performed on a battery pack comprising nickel metal hydride, NiMH, battery cells.

The present disclosure also relates to a computer program for improving the operational efficiency of a battery pack, comprising instructions which, when executed on at least one processor 14', cause the at least one processor 14' to carry out the method as described above.

The present disclosure also relates to a computer-readable storage medium carrying a computer program for improving the operational efficiency of a battery pack as described above.

The present disclosure also relates to a container 17 for balancing a battery pack 100; 150, wherein the container is filled with at least an amount of pressurized oxygen for filling the battery pack with the filling amount of oxygen to carry out the method described above.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flow-chart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method for improving the operational efficiency of a battery pack having at least two nickel metal hydride, NiMH, battery modules, each battery module having at least one battery cell, each battery module having a casing that encompasses the at least one battery cell and encloses a gas space, the gas spaces of the battery modules being connected to each other to form a common gas space, each battery cell having a first electrode, a second electrode, a porous separator, and an aqueous alkaline electrolyte arranged between the first electrode and the second electrode, the porous separator, the first electrode, and the second electrode being configured to allow exchange of hydrogen and oxygen by allowing gas to migrate between the electrodes, and at least one of the casings having a gas inlet for adding a gas or a liquid to the common gas space; the method comprising:
    obtaining data on the battery modules, wherein the data relates to the number of battery cells per battery module and the number of battery modules, temperature of each battery module, and the energy capacity of the battery modules;
    obtaining an internal resistance ($R_{i1}$, $R_{i2}$, $R_{i3}$) for at least two of the battery modules;
    determining, in case a difference in the internal resistance between any of the battery modules exceeds a predetermined first resistance threshold ($R_{t1}$), based on the internal resistance and the data on the battery module, a filling amount of oxygen to be filled into the battery module in order to reduce the difference in the internal resistance between any two battery modules to a level below the predetermined first resistance threshold ($R_{t1}$);
    initiating filling of the battery pack based on the determined filling amount of oxygen; and
    filling the battery pack with the determined filling amount of oxygen.

2. The method according to claim 1, wherein the internal resistance for the battery module and the predetermined first resistance threshold ($R_{t1}$) are determined per battery cell based on the internal resistance of each battery module and the obtained number of battery cells in each battery module.

3. The method according to claim 1, wherein the method further comprises:
    obtaining a voltage indication ($U_1$, $U_2$, $U_3$) over each of the at least two battery modules;
    determining whether the voltage indication ($U_1$, $U_2$, $U_3$) over any of the at least two battery modules exceeds a predetermined upper voltage indication threshold ($U_{t1}$); and
    performing the step of filling when the obtained voltage indication of each of the at least two battery modules is lower than the predetermined upper voltage indication threshold ($U_{t1}$) prior to the step of initiating filling of the battery pack with the determined filling amount of oxygen.

4. The method according to claim 3, wherein the predetermined upper voltage indication threshold ($U_{t1}$) is a function of the internal resistance ($R_{i1}$, $R_{i2}$, $R_{i3}$) for the at least two battery modules.

5. The method according to claim 3, further comprising, when the obtained voltage indication over any of the at least two battery modules is equal to or higher than the predetermined upper voltage indication threshold ($U_{t1}$):
    discharging the battery pack to reduce the voltage over the at least two battery modules to a level below the predetermined upper voltage indication threshold ($U_{t1}$) prior to initiating filling of the battery pack with the determined filling amount of oxygen.

6. The method according to claim 3, further comprising:
    determining whether the voltage indication over any of the at least two battery modules is lower than or equal to a predetermined lower voltage indication threshold ($U_{t0}$); and
    performing the step of initiating filling when the obtained voltage indication over each of the at least two battery modules exceeds the predetermined lower voltage indication threshold ($U_{t0}$).

7. The method according to claim 6, further comprising, when the obtained voltage indication over any of the at least two battery modules is lower than or equal to the predetermined lower voltage indication threshold ($U_{t0}$):
    charging the battery pack to increase the voltage over the at least two battery modules to a level above the predetermined lower voltage indication threshold ($U_{t0}$), prior to performing the step of initiating filling of the battery module with the determined filling amount of oxygen.

8. The method according to claim 6, wherein the step of initiating filling further comprises filling the battery pack with hydrogen prior to filling the at least two battery modules with oxygen.

9. The method according to claim 3, wherein the voltage indication is selected to be an open circuit voltage over the at least two battery modules, and the predetermined upper voltage indication threshold is temperature dependent.

10. The method according to claim 3, wherein the voltage indication is related to State of Charge, SOC, of the battery module.

11. The method according to claim 1, wherein the filling of the battery pack is with an inert gas in conjunction with filling of the battery pack with oxygen.

12. The method according to claim 11, wherein the inert gas is selected to be any combination of: Argon, Nitrogen, Helium and/or air.

13. The method according to claim 1, wherein the initiating filling further comprises initiating the preparation of a container with the determined filling amount of oxygen to reduce the difference in the internal resistance between the at least two battery modules.

14. The method according to claim 1, further comprising, after filling of the battery pack with oxygen:
- obtaining an after filling parameter related to the internal resistance ($R_{i1}, R_{i2}, R_{i3}$) after filling of the battery pack;
- determining, whether a difference in the after filling parameter between any of the at least two battery modules exceeds a predetermined second threshold value,
- determining, in case the difference in the after filling parameter between any of the battery modules exceeds the predetermined second threshold value, based on the after filling parameter of the battery modules and the data on each battery module, an additional filling amount of oxygen to be filled into the battery pack in order to reduce the difference in the after filling parameter between any two battery modules to a level below the predetermined second threshold value; and
- filling the battery pack with the determined additional amount of oxygen.

15. A non-transitory computer readable medium for storing instruction code for improving the operational efficiency of a battery pack according to the method of claim 1.

* * * * *